(12) United States Patent
Tzeng et al.

(10) Patent No.: US 7,738,712 B2
(45) Date of Patent: Jun. 15, 2010

(54) MIXING 2-D GRADIENT-DIFFERENCE AND INTERPOLATION/DECIMATION METHOD AND DEVICE FOR SCALING A DIGITAL IMAGE

(75) Inventors: Ying-chang Tzeng, Shijr (TW); Han-cheng Huang, Shijr (TW)

(73) Assignee: Aten International Co., Ltd. (TW)

( * ) Notice: Subject to any disclaimer, the term of this patent is extended or adjusted under 35 U.S.C. 154(b) by 1199 days.

(21) Appl. No.: 11/326,168

(22) Filed: Jan. 4, 2006

(65) Prior Publication Data

US 2007/0154114 A1    Jul. 5, 2007

(51) Int. Cl.
*G06K 9/36* (2006.01)

(52) U.S. Cl. .................................... 382/232; 382/300

(58) Field of Classification Search ................. 382/232, 382/298, 299, 300; 345/87, 538
See application file for complete search history.

(56) References Cited

U.S. PATENT DOCUMENTS

| | | | | |
|---|---|---|---|---|
| 4,090,188 A * | 5/1978 | Suga | ........................... | 345/472 |
| 4,988,984 A | 1/1991 | Gonzalez-Lopez | | |
| 6,178,272 B1 * | 1/2001 | Segman | ....................... | 382/298 |
| 6,369,787 B1 * | 4/2002 | Wu et al. | ....................... | 345/87 |
| 6,450,647 B1 * | 9/2002 | Takeuchi | ...................... | 353/69 |
| 6,553,153 B1 * | 4/2003 | Cui | ............................ | 382/298 |
| 6,704,463 B1 | 3/2004 | Okada et al. | | |
| 6,963,669 B2 * | 11/2005 | Blosser | ........................ | 382/240 |
| 7,298,928 B2 * | 11/2007 | Huang et al. | ................. | 382/299 |
| 2002/0145610 A1 * | 10/2002 | Barilovits et al. | ............ | 345/538 |
| 2006/0152597 A1 * | 7/2006 | Shimizu | ................... | 348/222.1 |
| 2010/0026722 A1 * | 2/2010 | Kondo | ......................... | 345/660 |

FOREIGN PATENT DOCUMENTS

WO     WO-03077542 A  *  9/2003
WO     WO-03077542 A1 *  9/2003

* cited by examiner

*Primary Examiner*—Brian Q Le
*Assistant Examiner*—Mekonen Bekele
(74) *Attorney, Agent, or Firm*—Chen Yoshimura LLP (57) ABSTRACT

A method of image processing for transforming an input image with a first resolution into an output image with a second resolution is provided. The input image is defined with a plurality of input pixels, and the output image is defined with a plurality of output pixels. The method includes the steps of interpolating pixel values of the plurality of input pixels based on a contrast coefficient, gathering a first group and a second group of input pixels from the plurality of input pixels, corresponding to an output pixel, based on a scale between the first and second resolutions, wherein a displayed area distributed by the first group of input pixels interlaces a displayed area distributed by the output pixel but a displayed area distributed by the second group of input pixels is separated away from the displayed area of the output pixel, generating a plurality of control coefficients, and determining a value of the output pixel based on the plurality of control coefficients, the first group of input pixels and the second group of input pixels.

11 Claims, 10 Drawing Sheets

| Input value | Output value | Input value | Output value |
|---|---|---|---|
| -256 ~ -128 | 0 | 511 ~ 384 | 255 |
| -127 ~ -96 | 1 | 383 ~ 362 | 254 |
| -95 ~ -80 | 2 | 351 ~ 346 | 253 |
| -79 ~ -64 | 3 | 335 ~ 320 | 252 |
| -63 ~ -56 | 4 | 319 ~ 312 | 251 |
| -55 ~ -48 | 5 | 311 ~ 304 | 250 |
| -47 ~ -40 | 6 | 303 ~ 296 | 249 |
| -39 ~ -32 | 7 | 295 ~ 288 | 248 |
| -31 ~ -24 | 8 | 287 ~ 280 | 247 |
| -23 ~ -16 | 9 | 279 ~ 272 | 246 |
| -15 ~ -8 | 10 | 271 ~ 264 | 245 |
| -7 ~ 0 | 11 | 263 ~ 256 | 244 |
| 1 ~ 4 | 12 | 255 ~ 252 | 243 |
| 5 ~ 8 | 13 | 251 ~ 248 | 242 |
| 9 ~ 12 | 14 | 247 ~ 244 | 241 |
| 13 ~ 15 | 15 | 243 ~ 240 | 240 |
| Others | The same as input value | | |

FIG. 10

MIXING 2-D GRADIENT-DIFFERENCE AND INTERPOLATION/DECIMATION METHOD AND DEVICE FOR SCALING A DIGITAL IMAGE

BACKGROUND OF INVENTION

1. Field of the Invention

The present invention relates to an image processing method and device, and more particularly, to a method and device to flexibly scaling up and scaling down an image.

2. Description of the Prior Art

In a digital image processing system, scaling or resizing an image is an important function. A conventional flat display provides various resolutions such as 640 pixels by 480 pixels, 800 pixels by 600 pixels, 1024 pixels by 768 pixels, 1280 pixels by 1024 pixels, while the amount of pixels is adjustable. Different scaling methods cause different clarity and contrast of image output. In traditional duplication and removal method, duplicating a pixel based on required scale produces an addition of pixels with identical intensity. However, by using such method, a saw edge of an image is shown as the image is enlarged by non-integrate times (e.g. 1.33 times) or a much higher enlargement, while a distortion of the image occurs as the image is shrunk. By contrast, another method using linear interpolation by which an addition of pixels is produced depending on location and intensity of adjacent pixels has a better image quality without an obvious saw edge of the scaled image. Such prior art methods are disclosed in Taiwan Patent No. 452757 and U.S. Pat. No. 6,704,463, hereby incorporated by reference.

SUMMARY OF INVENTION

It is therefore a primary objective of this invention to provide a method and device for flexibly scaling up and scaling down an image.

Briefly summarized, the claimed invention provides an image-processing device for transforming an input image with a first resolution into an output image with a second resolution. The input image is defined with a plurality of input pixels, while the output image is defined with a plurality of output pixels. The image-processing device includes an input unit for receiving the plurality of input pixels, a parsing unit for gathering a first group and a second group of input pixels from the plurality of input pixels, based on a scale between the first and second resolutions, wherein a displayed area distributed by the first group of input pixels interlace a predetermined displayed area distributed by the output pixels but a displayed area distributed by the second group of input pixels is separated away from the displayed area of the intermediate pixel, a coefficient controller for generating a plurality of control coefficients, a processing unit electrically connected with the parsing unit and the coefficient controller, for determining a value of the output pixel, based on the plurality of control coefficients, the first group of input pixels and the second group of input pixels; and an output unit for outputting the output pixel.

According to the claimed invention, a method of image processing for transforming an input image with a first resolution into an output image with a second resolution is provided. The input image is defined with a plurality of input pixels, and the output image is defined with a plurality of output pixels. The method includes the steps of interpolating pixel values of the plurality of input pixels based on a contrast coefficient; gathering a first group and a second group of input pixels from the plurality of input pixels, corresponding to an output pixel, based on a scale between the first and second resolutions, wherein a displayed area distributed by the first group of input pixels interlaces a displayed area distributed by the output pixel but a displayed area distributed by the second group of input pixels is separated away from the displayed area of the output pixel; generating a plurality of control coefficients; and determining a value of the output pixel based on the plurality of control coefficients, the first group of input pixels and the second group of input pixels.

According to the claimed invention, an image processing for transforming an input image with a first resolution into an output image with a second resolution is provided. The input image is defined with a plurality of input pixels, and the output image is defined with a plurality of output pixels. The method includes the steps of determining a horizontal ratio, a vertical ratio and a plurality of input pixels corresponding to each output pixel according to a scale between the first resolution and the second resolution; determining a horizontal parameter and a vertical parameter corresponding to the determined plurality of input pixels based on the horizontal ratio and the vertical ratio; and calculating a value of the output pixel by weighing the determined plurality of input pixels with a product of the horizontal parameter and the vertical parameter.

The disclosed inventions will be described with reference to the accompanying drawings, which show important sample embodiments of the invention and which are incorporated in the specification hereof by reference.

DETAILED DESCRIPTION OF THE PREFERRED EMBODIMENT

Figure 1:
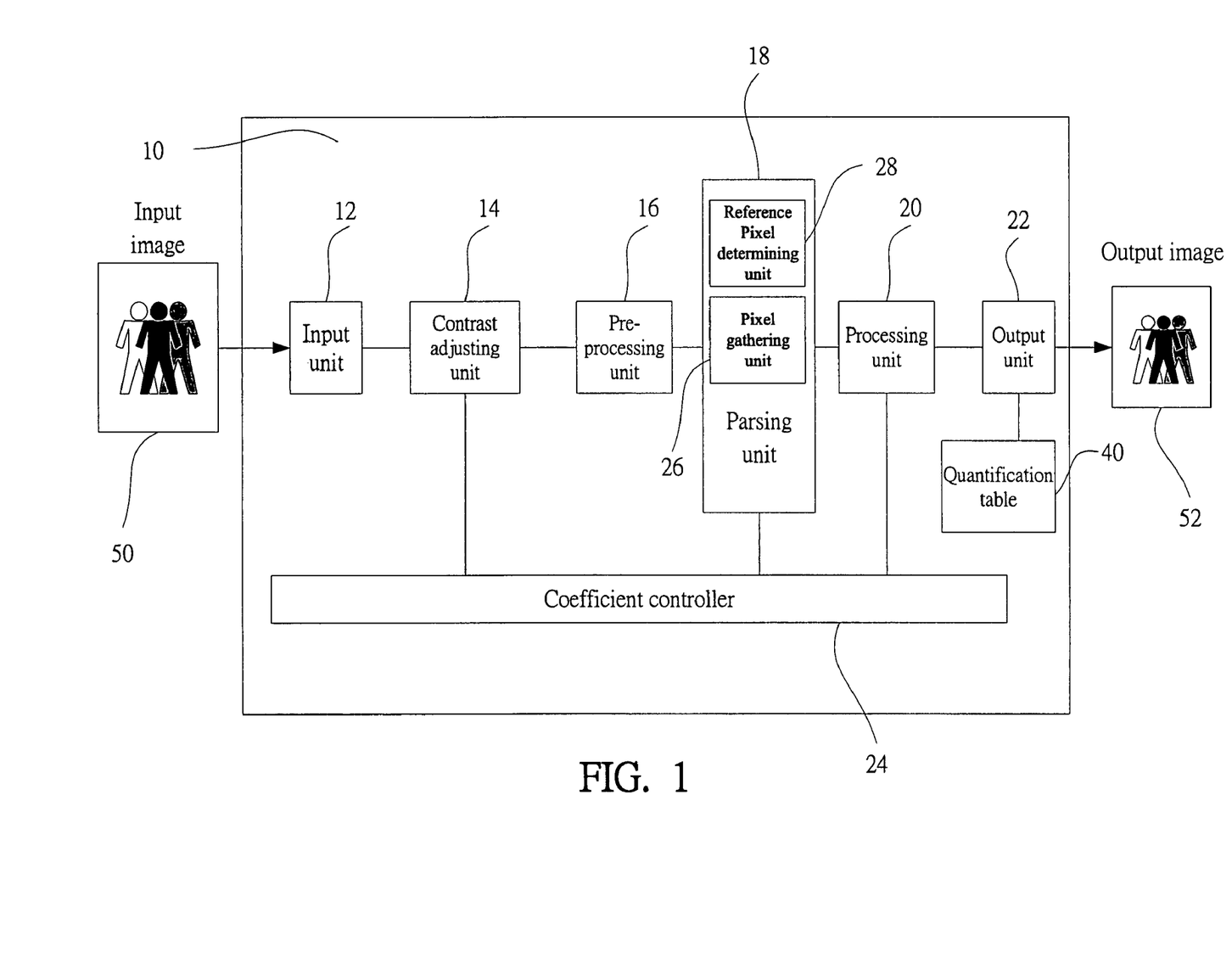
FIG. 1 shows a functional block diagram of an image-processing device according to the present invention.

Please refer to FIG. 1, which shows a functional block diagram of an image-processing device 10 according to the present invention. The image-processing device 10 is used for transforming an input image 50 with a first resolution into an output image 52 with a second resolution. The input image 50 is defined with a plurality of input pixels, known as JPEG or MPEG format, while the output image 52 is defined by a plurality of output pixels. The plurality of input pixels are fed into an input unit 12 and then sent to a contrast adjusting unit 14 electrically connected to the input unit 12. The color adjusting unit 14 can smooth or sharpen the input image 50 according to a user's requirement. Then the pre-processing unit 16 serially receives the plurality of input pixels and transforms them in an array to shorten the image-processing time. The parsing unit 18 is used for determining a plurality of input pixels corresponding to each output pixel. Then the processing unit 20 produces a value for each output pixel based on a plurality of control coefficients generated from the coefficient controller 24 and the corresponding input pixels. Finally, the output unit 22 outputs the output pixels to form a new output image 52. The detailed operation of the element depicted in FIG. 1 is introduced hereinafter.

Figure 8:
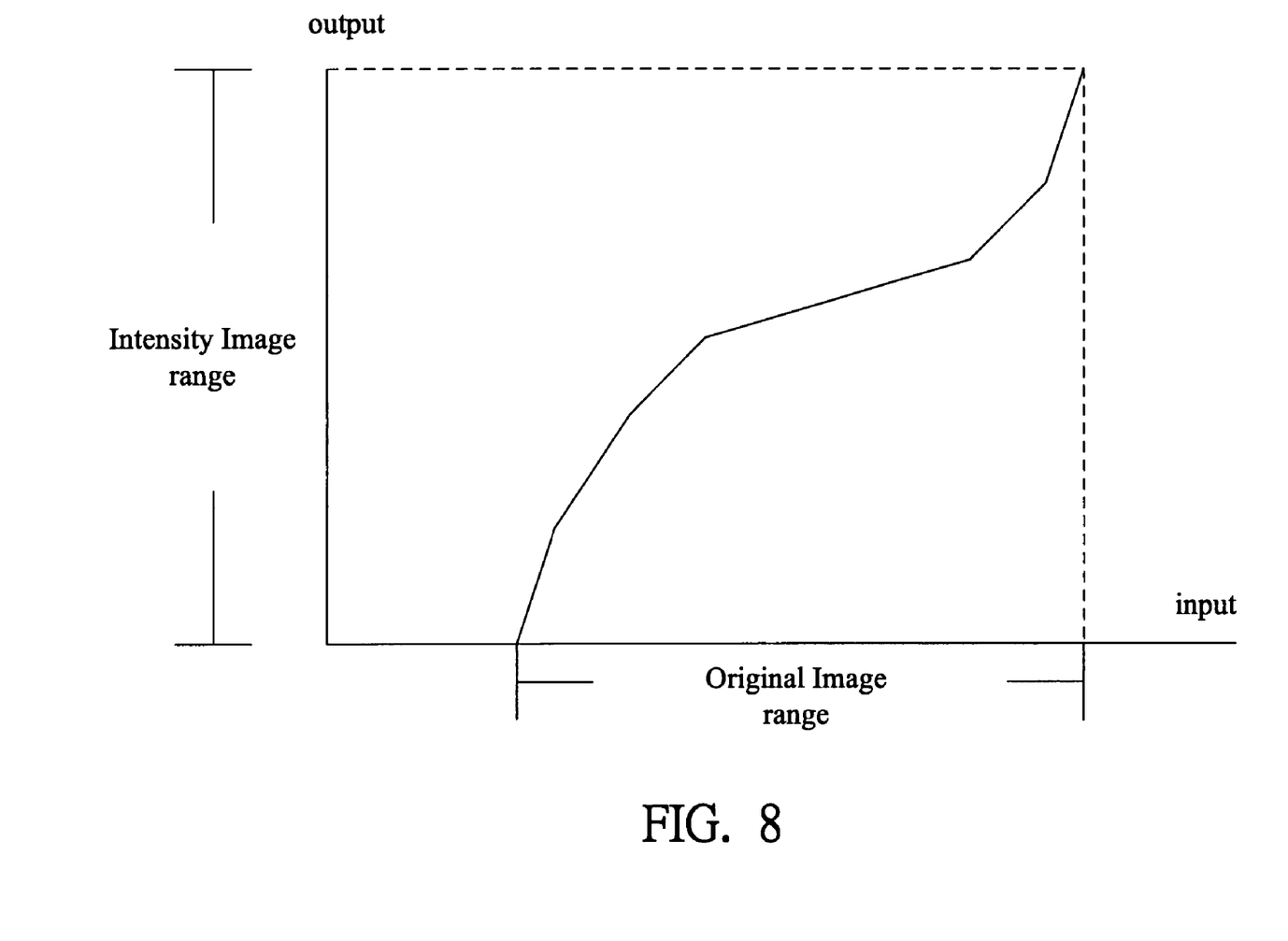
FIG. 8 shows a diagram of amplitude-rescaling mechanism for strengthening the edge of an image.
Figure 9:
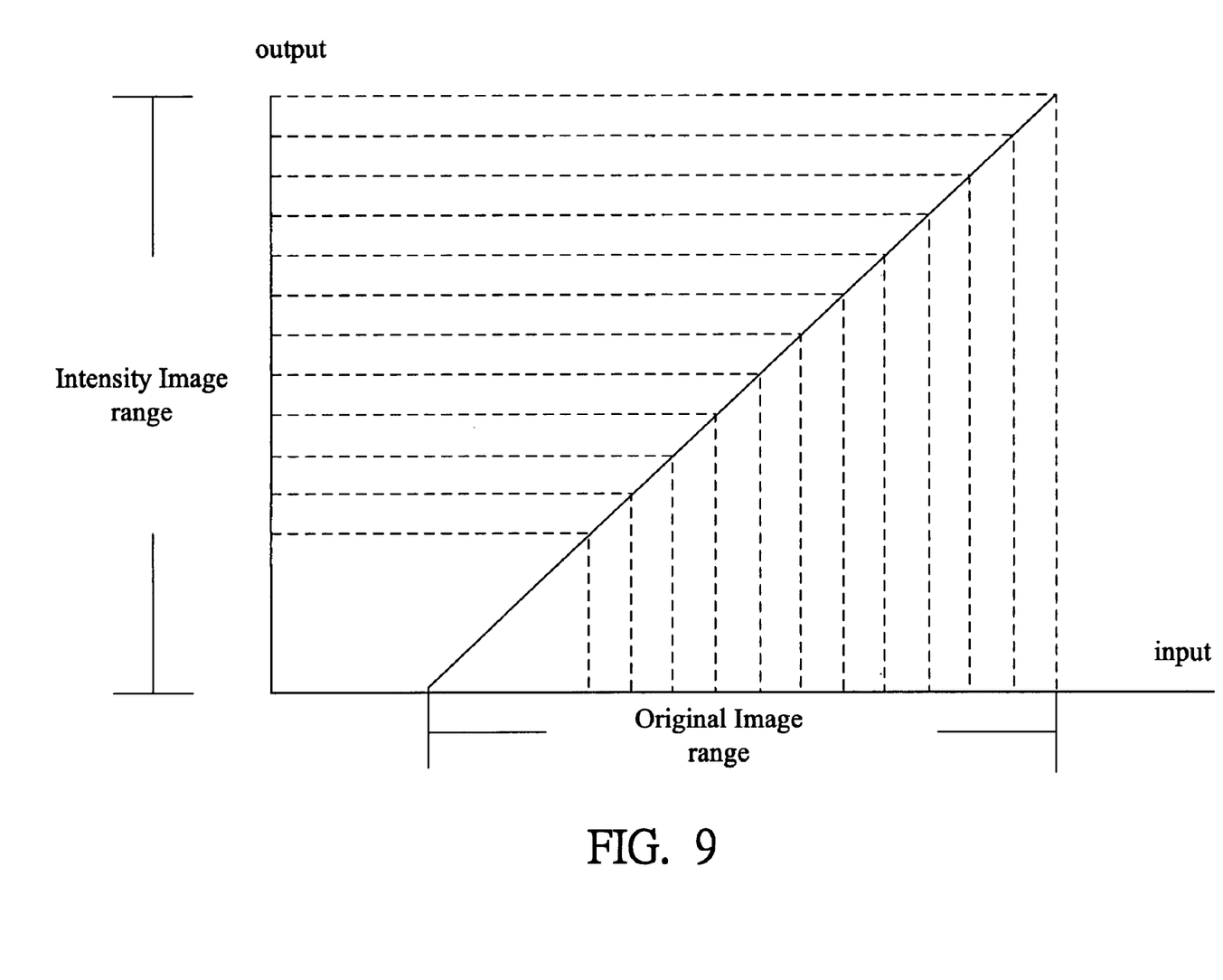
FIG. 9 shows a diagram of quantified amplitude method to strengthen the edge of an image.

Similar to conventional function of the use of a high pass filter, the contrast adjusting unit 14 is used for enhancing the edge of an image to be identified, especially a distortion image. In order to compensate contrast of the image resulting from insufficient brightness, poor setting of a diaphragm, or insufficient dynamic range of an image sensor, each pixel f(m,n) can be improved by amplitude-rescaling as shown in FIG. 8, or quantified amplitude method as shown in FIG. 9 to strengthen the edge of an image according to specifications.

For a function of a pixel f(m,n), its gradient is expressed by $$\nabla f = \frac{\partial f}{\partial m} i + \frac{\partial f}{\partial n} j = f_m i + f_n j,$$

and the magnitude of the gradient is defined as $|\nabla f| = (f_m^2 + f_n^2)^{1/2}$, where $f_m$ indicates a gradient component in m direction (column), and $f_n$ indicates a gradient component in n direction (row). In this embodiment, magnitude of the gradient is simplified as $|\nabla f| = a \times |f_m| + b \times |f_n|$, where coefficients a and b can be set by a user.

Figure 2:
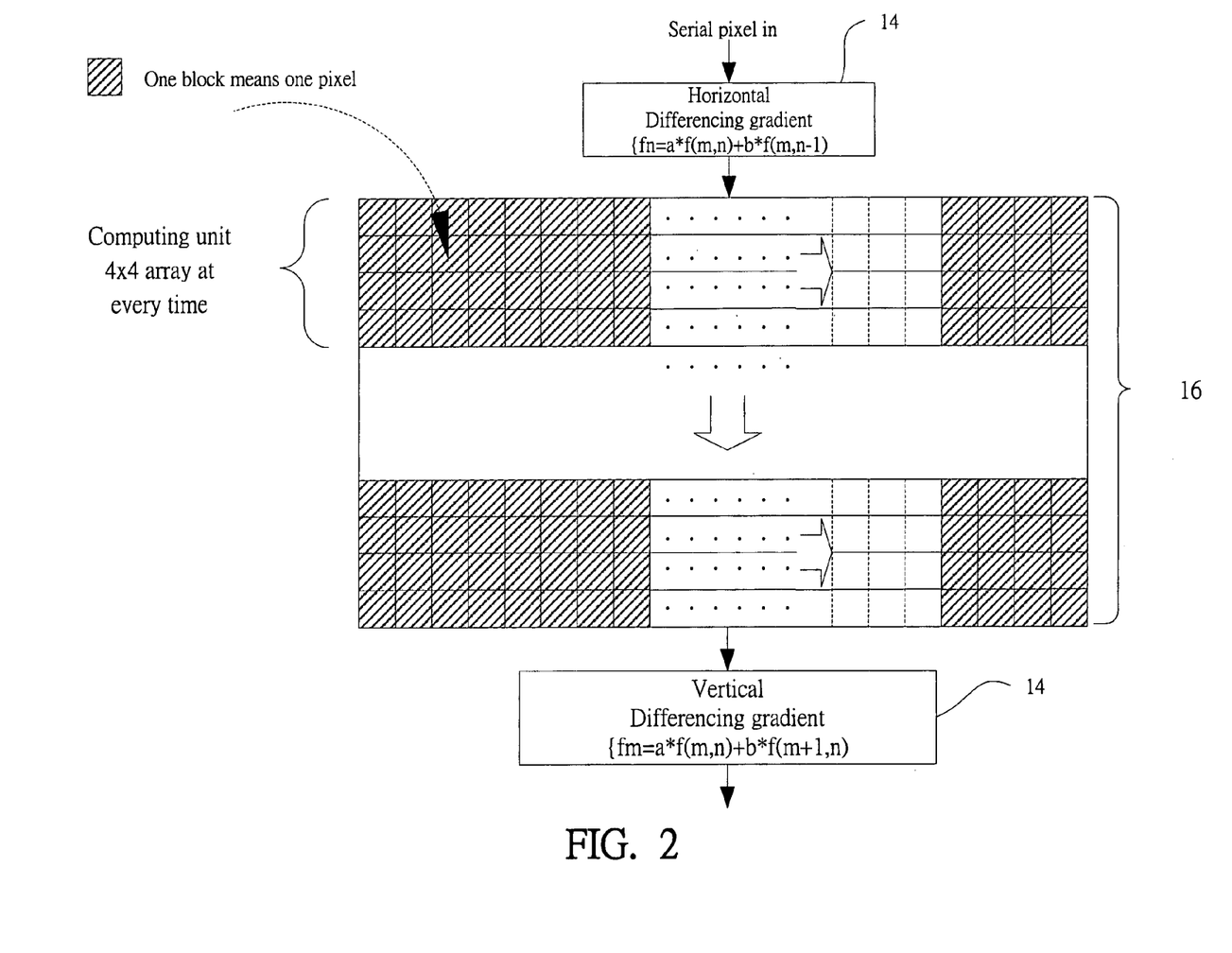
FIG. 2 illustrates a diagram of the contrast adjusting unit and the pre-processing unit performing a differencing gradient calculation.

Please refer to FIG. 2 which illustrates a diagram of the contrast adjusting unit 14 and the pre-processing unit 16 performing a differencing gradient calculation. The contrasting adjusting unit 14 interpolates the fed input pixels based on an equation as follows:

$$f_H(m,n) = a \times f(m,n) + b \times f(m,n-1),\qquad\text{(Equation 1)}$$

If(n=1) then $f_H(m,n) = f(m,n)$, where f(m,n) indicates the $m_{th}$-row, $n_{th}$-column original input pixel, a, b indicate gradient coefficients provided by the coefficient controller 24 and the $f_H(m,n)$ indicates a $m_{th}$-row, $n_{th}$-column pixel to have been processed in a horizontal direction. The coefficients a, b can be set by a user, where a value of the coefficient a is in a range between 0.5 and 1.5, and coefficient b equals to 1-a. While the value of the coefficient a is larger than 1, as well as the coefficient b is a negative number, an outline of the image becomes clearer. Conversely, while the coefficient a is less than 1, as well as the coefficient b is a positive number, the entire image looks more smooth.

The processed input pixels will then be stored into the pre-processing unit 16. The pre-processing unit 16 divides an M×N pixel array into multiple k×k arrays and then stores these k×k arrays into a memory in sequence. Preferably, k=4 is defined, i.e. the pre-processing unit 16 may transform every sixteen differenced input pixels into a 4×4 pixel array. Next, the 4×4 array are read from the pre-processing unit 16 and performs similar gradient differencing calculation in vertical direction by $$f_v(m,n) = a \times f_H(m,n) + b \times f_H(m+1,n)\qquad\text{(Equation 2)}$$

If(m=final) then $f_v(m,n) = f_H(m,n)$, where $f_v(m,n)$ indicates a $m_{th}$-row, $n_{th}$-column pixel to have been processed in a vertical direction, the $f_H(m,n)$ indicates a $m_{th}$-row, $n_{th}$-column pixel to have been processed in a horizontal direction, a, b indicate gradient coefficients similar to Equation 1. By means of the processing of the contrast adjusting unit 14, the values of $f_H(m,n)$ and $f_v(m,n)$ are in a range of −256~511.

Figure 3:
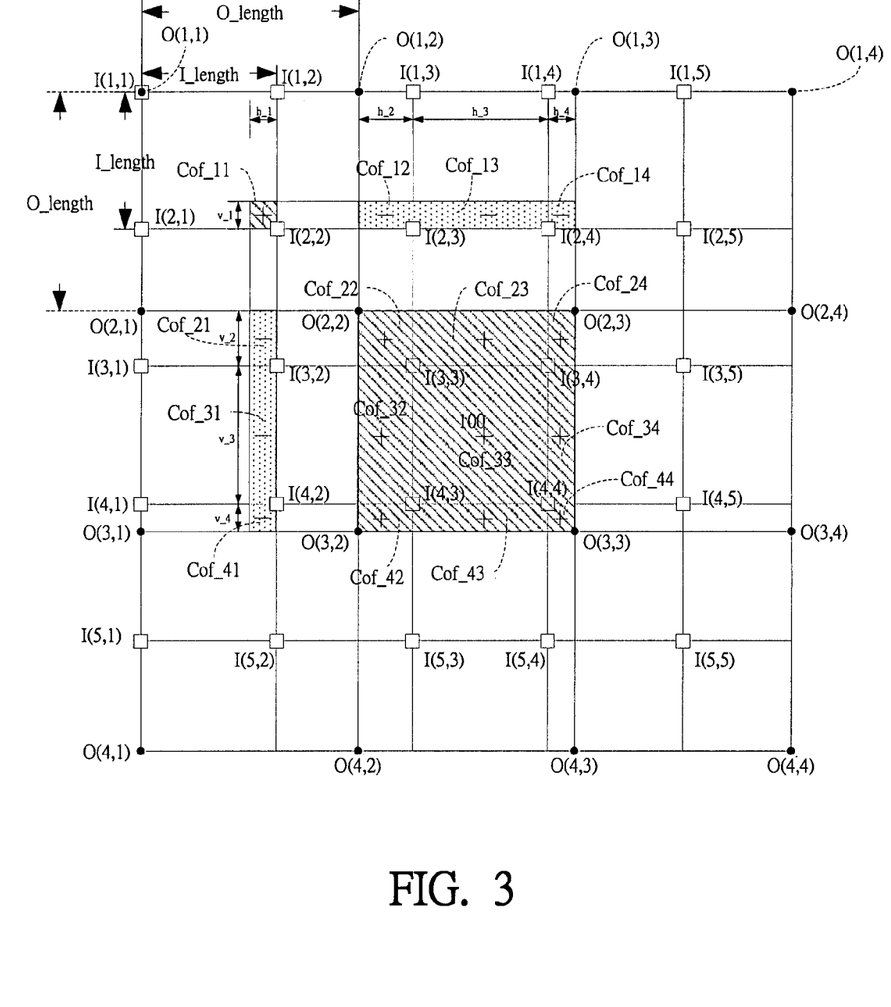
FIG. 3 depicts a schematic diagram of an output pixel O(2,2) and its relative input pixels according to the present invention.
Figure 4:
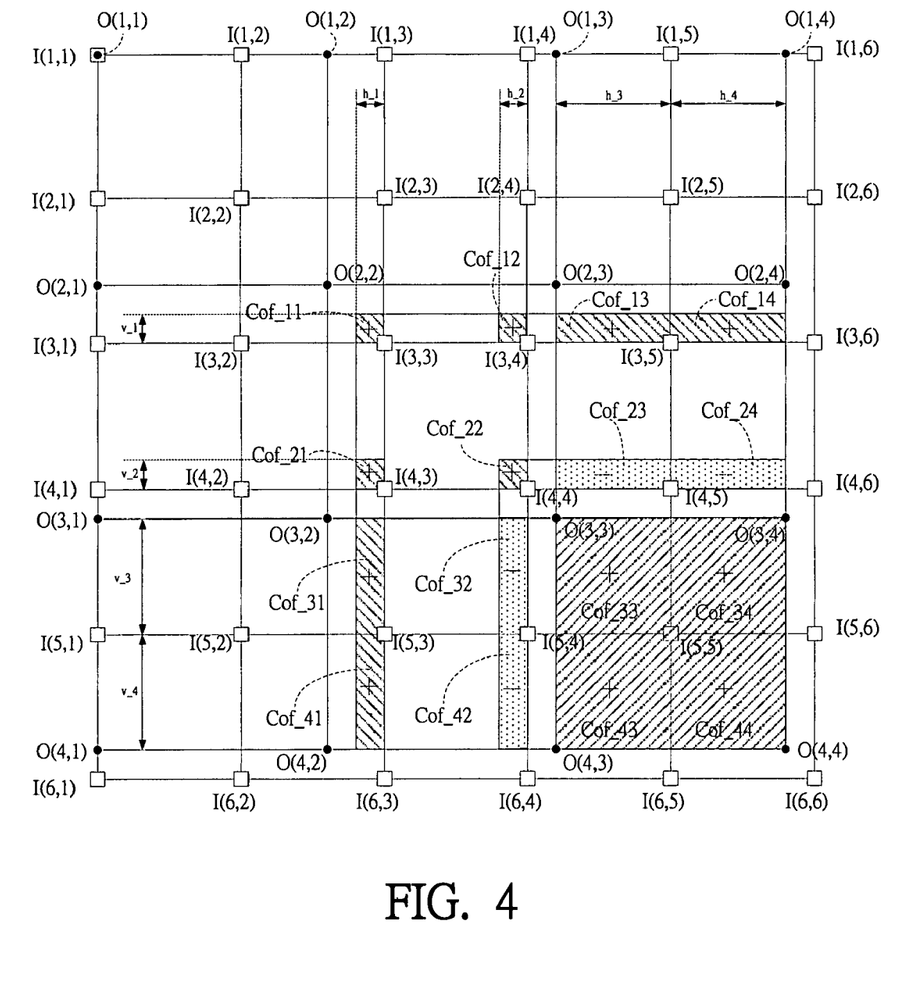
FIG. 4 depicts a schematic diagram of an output pixel O(3,3) and its relative input pixels according to the present invention.

Please refer to FIGS. 3 and 4 in conjunction to FIG. 1. FIG. 3 depicts an example of an output pixel O(2,2) and its relative input pixels according to the present invention. FIG. 4 depicts an example of an output pixel O(3,3) and its relative input pixels according to the present invention. In addition to generating coefficients a, b, the coefficient controller 24 also outputs a ratio number referencing a scale between the original resolution and the desired resolution. For example, if scaling down original resolution with 1024 by 768 pixels to desired resolution with 640 by 480 pixels is set, a ratio of 5/8 (640/1024) in horizontal and a ratio of 5/8 (480/768) in vertical are obtained. At the same time, the reference pixel determining unit 26 may determine a reference input pixel corresponding to each output pixel by using $$(pv-1) \times \text{vertical\_L} \leq sv \times \text{vertical\_M} \leq pv \times \text{vertical\_L},$$
$$\text{and}\qquad\text{(equation 3)}$$

$$(ph-1) \times \text{horizontal\_L} \leq sh \times \text{horizontal\_M} \leq ph \times \text{horizontal\_L},\qquad\text{(equation 4)}$$

where pv indicates a vertical coordinate of the reference input pixel, ph indicates a horizontal coordinate of the reference input pixel, sv and sh respectively indicate a vertical and a horizontal coordinate of the output pixels corresponding to the reference input pixels.

As shown in FIG. 3, as Horizontal_L=5, Horizontal_M=8, Vertical_L=5 and Vertical_M=8 are given (because of a scale down ratio of 5/8) and the output pixel O(2,2) is given (i.e. sv=sh=2), pv=ph=4 is concluded by applying equations 3 and 4. That means input pixel I(4,4) is regarded as the reference input pixel to output pixel O(2,2). As soon as the reference input pixel I(4,4) is selected, a pixel array composed of 16 input pixels including the reference input pixel I(4,4) is determined by assigning the other 15 input pixels extending out of the reference input pixel I(4,4) by previous three rows and previous three columns. In other words, a basis for determining a value of the output pixel O(2,2) is the input pixel array consisting of $$\begin{bmatrix} I(1,1) & I(1,2) & I(1,3) & I(1,4) \\ I(2,1) & I(2,2) & I(2,3) & I(2,4) \\ I(3,1) & I(3,2) & I(3,3) & I(3,4) \\ I(4,1) & I(4,2) & I(4,3) & I(4,4) \end{bmatrix}.$$

In general, for the output pixel O(sv,sh), its corresponding input pixel array is $$\begin{bmatrix} I(pv-3, ph-3) & I(pv-2, ph-3) & I(pv-1, ph-3) & I(pv, ph-3) \\ I(pv-3, ph-2) & I(pv-2, ph-2) & I(pv-1, ph-2) & I(pv, ph-2) \\ I(pv-3, ph-1) & I(pv-2, ph-1) & I(pv-1, ph-1) & I(pv, ph-1) \\ I(pv-3, ph) & I(pv-2, ph) & I(pv-1, ph) & I(pv, ph) \end{bmatrix}.$$

It should be appreciated that, in this embodiment, a 4×4 input pixel array is used, yet an M×N input pixel array where M and N are integrates is also selectable depending on the user's demand.

While the input pixel array is selected, the pixel gathering unit 28 of the parsing unit 18 can divide 16 input pixels of the input pixel array into a first group of input pixels and a second group of input pixels based on the interlaced relationship with the displayed area of the output pixel O(2,2). As shown in FIG. 3, a displayed area of output pixel O(2,2) is a square (oblique line area 100) with length O_length, while a displayed area of input pixel I(m,n) is a square with length I_length. So the first group of input pixels includes input pixels I(2,2), I(2,3), I(2,4), I(3,2), I(3,3), I(3,4), I(4,2), I(4,3) and I(4,4) of which the displayed areas are overlapped with the displayed area of the output pixel O(2,2). Conversely, the second group of input pixels includes input pixels I(1,1), I(1,2), I(1,3), I(1,4), I(2,1), I(3,1) and I(4,1) of which the displayed areas do not overlap the displayed area of the output pixel O(2,2).

Figure 5:
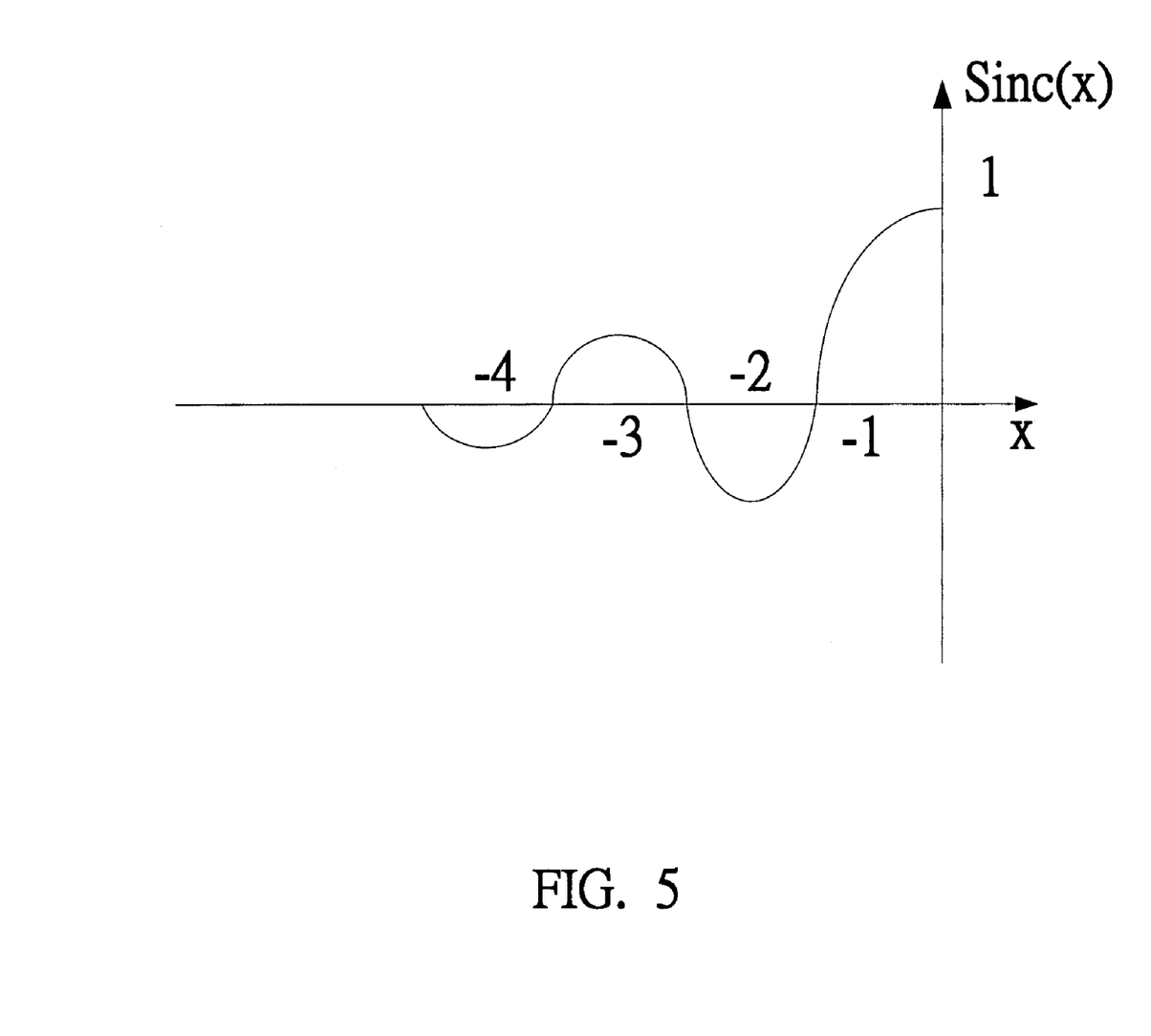
FIG. 5 illustrates a waveform diagram of negative half of sinc function.

Next, the coefficient controller 24 produces weigh parameters corresponding to each input pixel I(m,n). The weigh parameters are determined according to the size of the overlapped displayed area between input pixels and output pixel O(sv,sh). In addition, through the waveform of sinc function as shown in FIG. 5 illustrating a waveform diagram of negative half of sinc function, sign of weigh parameters corresponding to a weight of each input pixel I(m,n) is also concerned. The way to determine a sign of the weigh parameter is based on a concept of sinc function. In FIG. 3, the positive weigh parameters of Cof_22, Cof_23, Cof_24, Cof_32, Cof_33, Cof_34, Cof_42, Cof_43 and Cof_44 can regard as an interval of 0~−1 in x-coordinate of sinc function as shown in FIG. 5, while the negative weigh parameters of Cof_12, Cof_13, Cof_14, Cof_21, Cof_31 and Cof_41 can regard as an interval of −2~−1 in x-coordinate of sinc function.

In order to determine each weigh parameters, a horizontal parameter h_1 indicates a distance relationship between the input pixel I(m,ph1) and output pixel O(sv,sh); a horizontal parameter h_2 indicates a distance relationship between the input pixel I(m,ph2) and output pixel O(sv,sh); a horizontal parameter h_3 indicates a distance relationship between the input pixel I(m,ph3) and output pixel O(sv,sh), and a horizontal parameter h_4 indicates a distance relationship between the input pixel I(m,ph4) and output pixel O(sv,sh) are defined. In FIG. 3, input pixels I(1,4), I(2,4), I(3,4), I(4,4) all have the same horizontal parameter h_4=1, while input pixels I(1,3), I(2,3), I(3,3), I(4,3) have the same horizontal parameter h_3=5, input pixels I(1,2), I(2,2), I(3,2), I(4,2) have the same horizontal parameter h_2=2 and the input pixels I(1,1), I(2,1), I(3,1), I(4,1) have the same horizontal parameter h_1=−1.

By using a similar concept that determines the horizontal parameters, vertical parameters v_1, v_2, v_3 and v_4 are obtained, where a vertical parameter v_1 indicates a distance relationship between the input pixel I(pv1,n) and output pixel O(sv,sh); a vertical parameter v_2 indicates a distance relationship between the input pixel I(pv2,n) and output pixel O(sv,sh); a vertical parameter v_3 indicates a distance relationship between the input pixel I(pv3,n) and output pixel O(sv,sh), and a vertical parameter v_4 indicates a distance relationship between the input pixel I(pv4,n) and output pixel O(sv,sh). In FIG. 3, input pixels I(4,1), I(4,2), I(4,3), I(4,4) all have the same horizontal parameter v_4=1, while input pixels I(3,1), I(3,2), I(3,3), I(3,4) have the same horizontal parameter v_3=5, input pixels I(2,1), I(2,2), I(2,3), I(2,4) have the same horizontal parameter v_2=2 and the input pixels I(1,1), I(1,2), I(1,3), I(1,4) have the same horizontal parameter v_1=−1.

Continue to refer to FIG. 3, the displayed area of the input pixel I(2,4) overlapping with that of the output pixel O(2,2) is labeled by Cof_24. Similarly, the displayed area of the input pixel I(3,4) overlapping with that of the output pixel O(2,2) is labeled by Cof_34, the displayed area of the input pixel I(4,4) overlapping with that of the output pixel O(2,2) is labeled by Cof_44, and so on. In fact, the factor Cof_mn being a product of a vertical parameter v_m and a horizontal parameter h_n, serves as a weigh parameter of corresponding input pixel. For example, Cof_33 is a product of h_3 and v_3 (5×5=25), Cof_13 is a product of v_1 and h_3 (−1×5=−5), Cof_11 is a product of v_1 and h_1 (−1×(−1)=1).

In addition to the first group of input pixels, the second group of input pixels consisting of input pixels I(1,1), I(1,2), I(1,3), I(1,4), I(2,1), I(3,1) and I(4,1) of which displayed areas do not overlap with the displayed area 100 of the output pixel O(2,2) serves as offset pixels for calculating the value of the output pixel O(2,2). It should be noted that, in FIG. 3, horizontal parameters of the input pixels I(1,1), I(2,1), I(3,1) and I(4,1) equals to −1, while vertical parameters of the input pixels I(1,1), I(1,2), I(1,3) and I(1,4) equals to −1. This is because that a closer pixel has a larger weight, inversely, a farther pixel has less weight.

As to FIG. 4, horizontal parameters h_4 and h_3 respectively indicate distance relationship between the input pixels I(m,ph4), I(m,ph3) and output pixel O(sv,sh) equals to 4; a horizontal parameter h_2 indicates a distance relationship between the input pixel I(m,ph2) and output pixel O(sv,sh) equals to −1, and a horizontal parameter h_1 indicates a distance relationship between the input pixel I(m,ph1) and output pixel O(sv,sh) equals to 1.

In FIG. 4, by using equation 5, the reference input pixel I(5,5) corresponding to the output pixel O(3,3) is selected. As shown in FIG. 4, the first group of input pixels includes input pixels I(4,4), I(4,5), I(5,4) and I(5,5) of which the displayed areas are overlapped with the displayed area of the output pixel O(3,3). Conversely, the second group of input pixels includes input pixels I(2,2), I(2,3), I(2,4), I(2,5), I(3,2), I(3,3), I(3,4), I(3,5), I(4,2), I(4,3), I(5,2) and I(5,3) of which the displayed areas do not overlap with the displayed area of the output pixel O(3,3).

When the horizontal parameter and the vertical parameter associated with each input pixel are obtained, weigh coefficients Cof_11, Cof_12, . . . , Cof_43 and Cof_44 corresponding to each input pixel are calculated by using the following equation:

Cof_11=h_1×v_1/AD Cof_12=h_1×v_1/AD
　　Cof_13=h_1×v_3/AD Cof_14=h_1×v_4/AD

Cof_21=h_2×v_1/AD Cof_22=h_2×v_2/AD
　　Cof_23=h_2×v_3/AD Cof_24=h_2×v_4/AD

Cof_31=h_3×v_1/AD Cof_32=h_3×v_2/AD
　　Cof_33=h_3×v_3/AD Cof_34=h_3×v_4/AD

Cof_41=h_4×v_1/AD Cof_42=h_4×v_2/AD
　　Cof_43=h_4×v_3/AD Cof_44=h_4×v_4/AD where a factor AD is expressed by $$AD = \sum_{m=1}^{4}\sum_{n=1}^{4} h\_n \times v\_m.\qquad \text{(Equation 5)}$$

In this way, a sum of weigh parameters equals to 1, i.e. Cof_11+Cof_12+ . . . +Cof_43+Cof_44=1o As shown in FIGS. 3 and 4, the output pixel O(2,2)= Cof_11×I(1,1)+Cof_12×I(1,2)+Cof_13×I(1,3)+Cof_14×I (1,4)+Cof_21×I(2,1)+Cof_22×I(2,2)+Cof_23×I(2,3)+ Cof_24×I(2,4)+Cof_31×I(3,1)+Cof_32×I(3,2)+Cof_33×I (3,3)+Cof_34×I(3,4)+Cof_41×I(4,1)+Cof_42×I(4,2)+ Cof_43×I(4,3)+Cof_44×I(4,4), where Cof_11, Cof_22, Cof_23, Cof_24, Cof_32, Cof_33, Cof_34, Cof_42, Cof_43 and Cof_44 are positive numbers, and Cof_12, Cof_13, Cof_14, Cof_21, Cof_31 and Cof_41 are negative numbers. The output pixel O(3,3)=Cof_22×I(2,2)+Cof_23×I(2,3)+ Cof_24×I(2,4)+Cof_25×I(2,5)+Cof_32×I(3,2)+Cof_33×I (3,3)+Cof_34×I(3,4)+Cof_35×I(3,5)+Cof_42×I(4,2)+ Cof_43×I(4,3)+Cof_44×I(4,4)+Cof_45×I(4,5)+Cof_52×I (5,2)+Cof_53×I(5,3)+Cof_54×I(5,4)+Cof_55×I(5,5), where Cof_22, Cof_23, Cof_24, Cof_25, Cof_32, Cof_33, Cof 42, Cof_44, Cof_45, Cof_52, Cof_54 and Cof_55 are positive numbers, and Cof_34, Cof_35, Cof_43 and Cof_53 are negative numbers.

Preferably, a size of 4×4 input pixel array is enough to handle a scale-up or scale-down for an image by 0-3 times. It should be noted that the input pixel array can be spread to a size of M×N if desired.

It should be noted that a sum of weigh parameters corresponding to the first group of input pixels must be greater than a sum of weigh parameters corresponding to the second group of input pixels multiplied by 8 or more times. In other words, the parameters of selected input pixels are indicated below:

$$\sum_{\text{The first group of input pixels}} \text{Cof\_mn} \geq \qquad \text{(equation 6)}$$
$$8 \times \sum_{\text{The second group of input pixel}} |\text{Cof\_mn}|.$$

This is because that weigh parameters of the first group of input pixels (corresponding to function sinc in a range of 0~−1) has a larger weight compared to those of the second group of pixels (corresponding to function sinc(<−1)). If the sum of weigh parameters of the first group of input pixels is not greater than that of weigh parameters of the second group of input pixels multiplying by 8 times, magnifying values of Horizontal_L, Horizontal_M, Vertical_L, and Vertical_M, by multiplying a factor is necessary. For example, as shown in FIG. 4, on account of v_2=h_2=−1, h_1=v_1=1, and h_4=h_3=v_3=v_4, where the weigh parameters cof_33=cof_34=cof_34=cof_44=16, cof_13=cof_14=cof_31=cof_41=4, cof_23=cof_24=cof32=cof42=−4. In this way, cof_33+ cof_34+cof_34+cof_44=64 (a sum of the weigh parameters corresponding to the first group of input pixels in FIG. 5), while |cof_13|+|cof_14|+|cof_31|+|cof_41|+|cof_23|+ |cof_24|+|cof_23|+|cof_42|=36 (i.e. a sum of the weigh parameters corresponding to the first group of input pixels in FIG. 5). Apparently, the sum of the weigh parameters corresponding to the first group of input pixels is smaller than the sum of the weigh parameters corresponding to the second group of input pixels by 8 times. This means the second group of input pixels has a larger but improper weight for an output pixel. As a result, there are two resolutions to such a problem. In one aspect, when the original resolution with 1024 by 768 pixels is to be adjusted into desired resolution with 640 by 480 pixels, the ratio of 8/5 (1024/640) can be adjusted to 32/20. So, the scale ratio of 8/5 remains, and a sum of the weigh parameters corresponding to the first group of input pixels will be much greater than a sum of the weigh parameters corresponding to the second group of input pixels multiplied by 8; therefore, preventing the sum of the weigh parameters corresponding to the second group of input pixels from being closer to the sum of the weigh parameters corresponding to the first group of input pixels, and thus calculating an improper output pixel value. In another aspect, assigning all horizontal parameters and vertical parameter associated with the second group of input pixels as 1 or −1 independent on the sinc function is also feasible. Consequently, the processing unit 20 calculates a value of an output pixel by using $$O(sv, sh) = \sum_{m=1}^{M}\sum_{n=1}^{N} \text{Cof\_mn} \times I(m, n),\qquad \text{(equation 7)}$$

and outputs the result to the output unit 22. Then the output unit 22 recombines each calculated output pixels as an output image 52.

Figure 6:
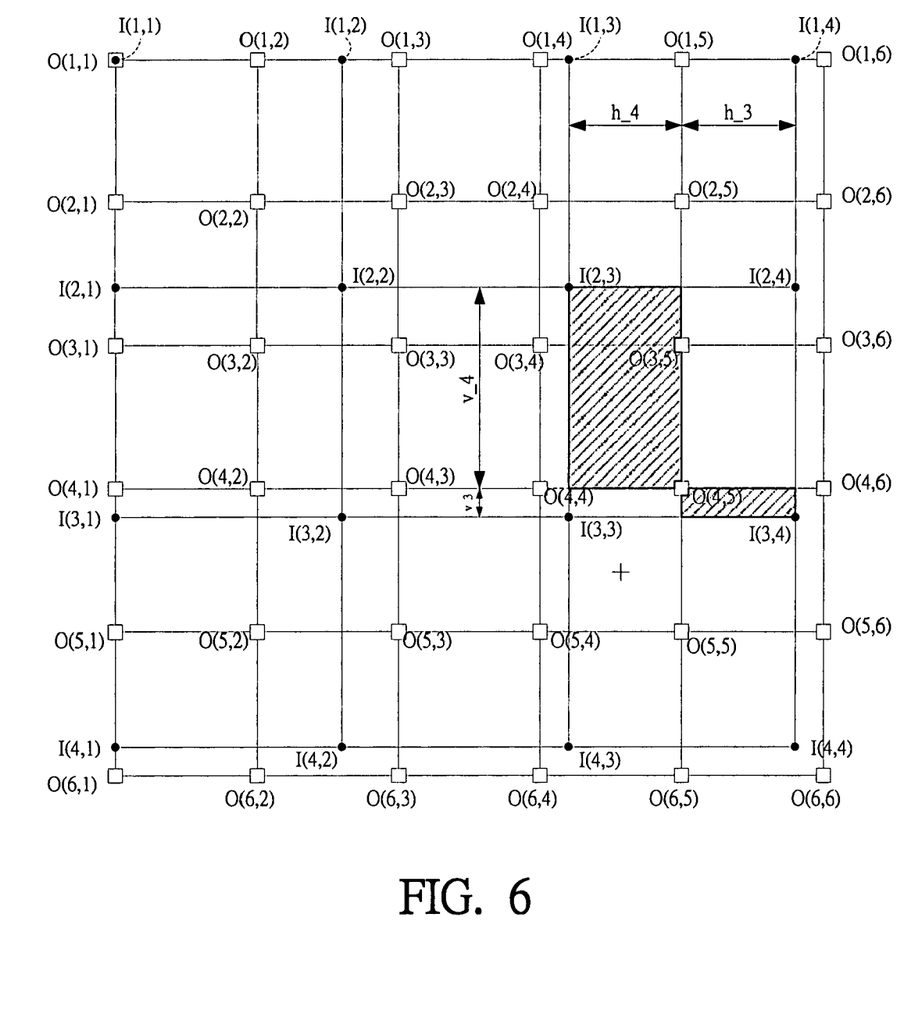
FIG. 6 shows an example of scaling up an image according to the present invention.

Please refer to FIG. 6, which shows an example of scaling up an image according to the present invention. For example, if scaling up original resolution with 640 by 480 pixels to a desired resolution with 1024 by 768 pixels is set, a ratio of 8/5 (1024/640) in horizontal and a ratio of 8/5 (768/480) in vertical are obtained. At the same time, the reference pixel determining unit 26 may determine a reference input pixel corresponding to each output pixel by using:

$$(pv−2)\times\text{vertical}\_L \leq (sv−1)\times\text{vertical}\_M \leq (pv−1)\times \text{vertical}\_L, \text{ and} \qquad \text{(equation 8)}$$

$$(ph−2)\times\text{horizontal}\_L \leq (sh−1)\times\text{horizontal}\_M \leq (ph−1)\times\text{horizontal}\_L, \qquad \text{(equation 9)}$$

where pv indicates a vertical coordinate of the reference input pixel, ph indicates a horizontal coordinate of the reference input pixel, sv and sh respectively indicate a vertical coordinate and a horizontal coordinate of the output pixels corresponding to the reference input pixels.

As shown in FIG. 6, Horizontal_L=8, Horizontal_M=5, Vertical_L=8, and Vertical_M=5, are given (because of a scaled up ratio of 8/5) and the output pixel O(4,5) is given (i.e. sv=4, sh=5), pv=3, and ph=4, are concluded by applying equations 5 and 6. This means input pixel I(3,4) is regarded as the reference input pixel to output pixel O(2,2). As soon as the reference input pixel I(3,4) is selected, a pixel array composed of 16 input pixels including the reference input pixel I(3,4) is determined by assigning the other 15 input pixels extending out of the reference input pixel I(3,4) by previous three rows and previous three columns. The default value of the input pixel is set to 0, if the assigned input pixel is far from the predetermined scope. In other words, a basis for determining a value of the output pixel O(4,5) is the input pixel array consisting of $$\begin{bmatrix} 0 & 0 & 0 & 0 \\ I(1,1) & I(1,2) & I(1,3) & I(1,4) \\ I(2,1) & I(2,2) & I(2,3) & I(2,4) \\ I(3,1) & I(3,2) & I(3,3) & I(3,4) \end{bmatrix}.$$

In general, for the output pixel O(sv,sh), its corresponding input pixel array is $$\begin{bmatrix} I(pv-3, ph-3) & I(pv-2, ph-3) & I(pv-1, ph-3) & I(pv, ph-3) \\ I(pv-3, ph-2) & I(pv-2, ph-2) & I(pv-1, ph-2) & I(pv, ph-2) \\ I(pv-3, ph-1) & I(pv-2, ph-1) & I(pv-1, ph-1) & I(pv, ph-1) \\ I(pv-3, ph) & I(pv-2, ph) & I(pv-1, ph) & I(pv, ph) \end{bmatrix}.$$

In addition, in contrary to the principle of scaling down an image, a larger weigh parameter is concerned in the condition that the original input pixel is far from a new output pixel by a longer distance, while a smaller weigh parameter is concerned in the inverse condition that the original input pixel is far from a new output pixel by a shorter distance. Furthermore, from FIG. 6, a new output pixel is always located in the field surrounded by the adjacent four input pixels. Therefore, a value of the vertical parameter v_2 must be −1, and that of vertical parameter v_1 must be 1. However, values of the vertical parameters v_3 and v_4 are obtained by utilizing similar ways of scaling down an image as depicted above, but interchange their values with each other. For example, in FIG. 6, a value of the vertical parameter v_3 equals to 1, while the vertical parameter v_4 equals to 7 (rather than v_3=7 and v_4=1). Similarly, h_1=1, h_2=−1, h_3=4, and h_4=4, are determined. In this way, the cof_43=h_4×v_3=1×4=4, cof_33=h_3×v_3=4, cof_44=h_4×v_4=28, and cof_34=h_3×v_4=28. Therefore, the input pixel closer to the output pixel has a larger weight.

It should be noted that, similar to the scale down mechanism, a sum of weigh parameters corresponding to the first group of input pixels is greater than that of a sum of weigh parameters corresponding to the second group of input pixels multiplying by 8 or more times. In other words, the parameters of selected input pixels should be as follows:

$$\sum_{\text{The first group of input pixels}} \text{Cof\_mn} \geq 8 \times \sum_{\text{The second groupe of input pixel}} |\text{Cof\_mn}|$$

Then, the processing unit 20, by using equation 6, can calculate the output pixel value.

Figure 7:
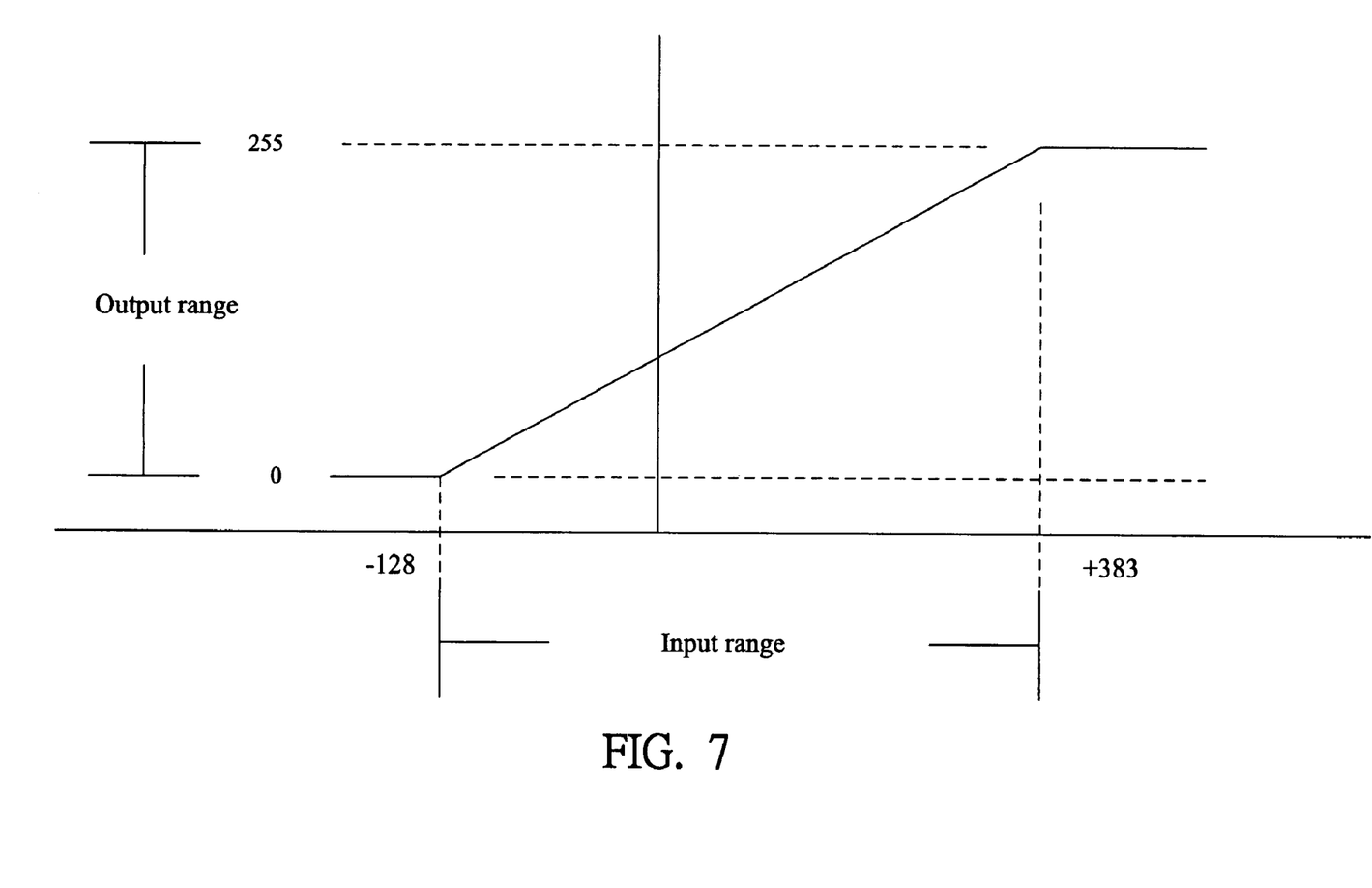
FIG. 7 shows a transfer relationship between input and output of the contrast adjusting unit depicted in FIG. 1.
Figure 10:
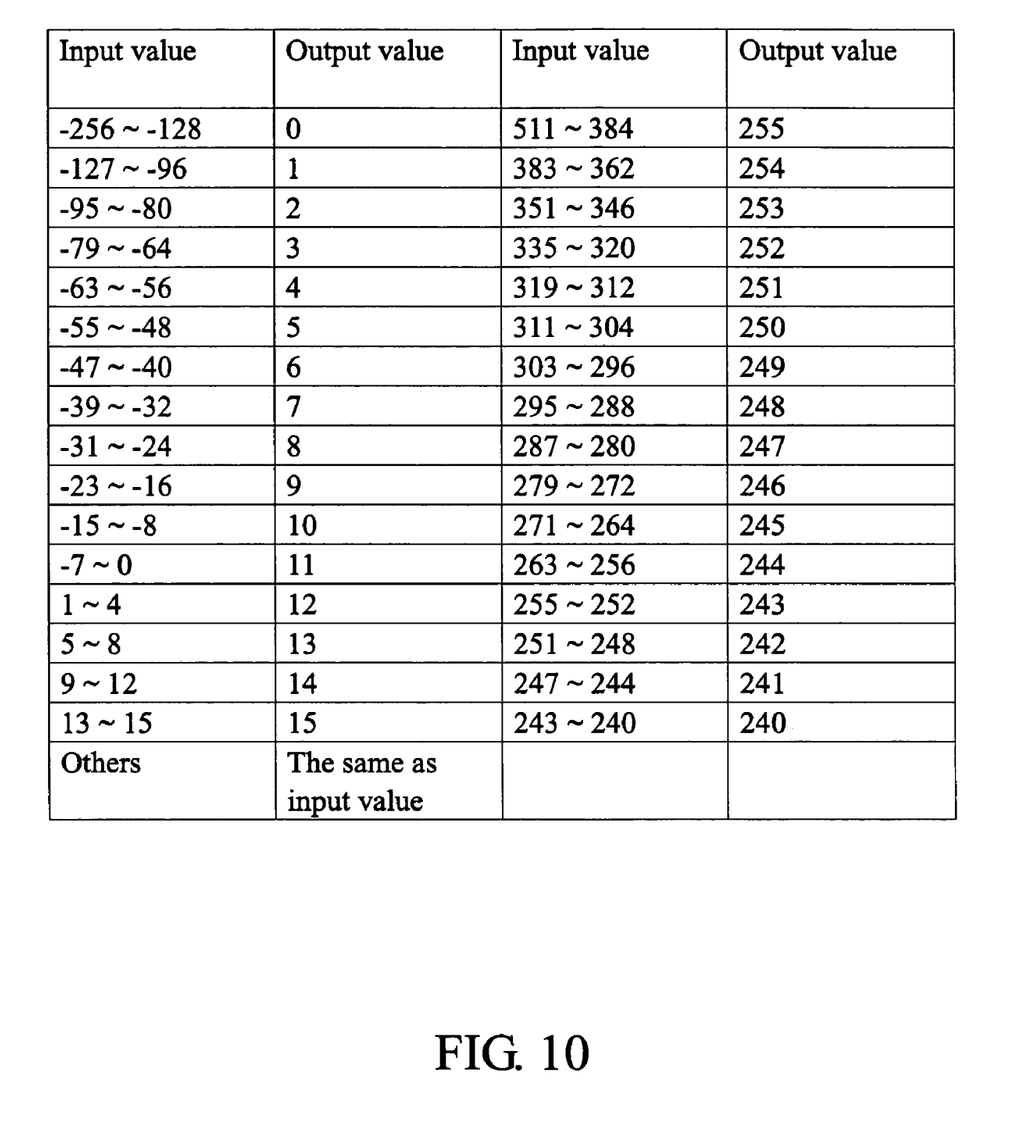
FIG. 10 is an example of a clipping relationship of the quantification table.

Therefore, in order to keep an output of pixel in a range of 0-255, as depicted in FIG. 7, the output unit 22 with reference to the quantification table 40 will clip, for example, the input value in a range between −256 and 511 to the output value in a range between 0 and 255. Referring to FIG. 10, the output unit 22 outputs a value of each pixel in a range of 0-255 based on the relationship as shown in FIG. 10. Finally, the output unit 22 will combine the output pixels to produce a new output image 52 with a second resolution.

It should be appreciated that the process of calculating the output pixels is performed in pipeline mode well known in the art.

To sum up, the present invention, no matter operated under a scale-up or scale-down function, will select a plurality of input pixels including a first group of input pixels of which the displayed areas are overlapped with the displayed area of the predetermined output pixels, and a second group of input pixels of which the displayed areas do not overlap the displayed area of the output pixels. By considering the overlapped area between each selected input pixel and the output pixel to determine weigh values of each input pixel, and using a concept of the sinc function to determine the sign of weigh value, the present invention can generate proper values of output pixels. Accordingly, using the present invention method or device, a better image quality is shown.

In contrast to prior art, the present invention can generate an output image which maintains desired color contrast and clarity according to an adjustment of image resolution of a flat display. Besides, a better image quality is obtained due to the use of a dual-gradient differencing and an offset distance relationship in vertical and horizontal direction concerning the concept of sinc function. In addition, using pipeline design in hardware, the present invention can speed up in processing image and thus shorten time in calculating a value of each output pixel.

The present invention has been described with reference to certain preferred and alternative embodiments which are intended to be exemplary only and not limited to the full scope of the present invention as set forth in the appended claims.

What is claimed is:

1. An image processing method implemented in an image-processing device for transforming an input image with a first resolution into an output image with a second resolution, the input image having a plurality of input pixels, the method comprising the steps of:

(a) a coefficient controller determining a horizontal ratio and a vertical ratio, and a parsing unit determining a plurality of input pixels corresponding to each output pixel according to a scale between the first resolution and the second resolution;

(b) the coefficient controller determining a horizontal parameter and a vertical parameter corresponding to each of the determined plurality of input pixels based on the horizontal ratio and the vertical ratio; and (c) a processing unit calculating a value of the output pixel by weighing each of the determined plurality of input pixels with a weight parameter which is proportional to a product of the corresponding horizontal parameter and the vertical parameter, wherein step (a) comprises the steps of:

(a1) determining a reference input pixel I(pv, ph) associated to each output pixel O(sv,sh); and (a2) gathering a input pixel array $$\begin{bmatrix} I(pv-n+1, ph-m+1) & I(pv-n+2, ph-m+1) \ldots & I(pv-1, ph-m+1) & I(pv, ph-m+1) \\ I(pv-n+1, ph-m+2) & I(pv-n+2, ph-m+2) \ldots & I(pv-1, ph-m+2) & I(pv, ph-m+2) \\ \vdots & \ddots & & \vdots \\ I(pv-n+1, ph-1) & I(pv-n+2, ph-1) \ldots & I(pv-1, ph-1) & I(pv, ph-1) \\ I(pv-n+1, ph) & I(pv-n+2, ph) \ldots & I(pv-1, ph) & I(pv, ph) \end{bmatrix}$$

the input pixel array comprising the reference input pixel I(pv, ph), a plurality of input pixels on the previous m−1 row to previous one row relative to the reference input pixel I(pv, ph), and a plurality of input pixels on previous n−1 to previous one columns relative to the reference input pixel I(pv, ph), wherein the above steps are performed by the image-processing device.

2. The method of claim 1, wherein both the factors m and n equal to 4 and the input pixel array is consisted of $$\begin{bmatrix} I(pv-3, ph-3) & I(pv-2, ph-3) & I(pv-1, ph-3) & I(pv, ph-3) \\ I(pv-3, ph-2) & I(pv-2, ph-2) & I(pv-1, ph-2) & I(pv, ph-2) \\ I(pv-3, ph-1) & I(pv-2, ph-1) & I(pv-1, ph-1) & I(pv, ph-1) \\ I(pv-3, ph) & I(pv-2, ph) & I(pv-1, ph) & I(pv, ph) \end{bmatrix}.$$

3. The method of claim 2, wherein when the first resolution is scaled up to the second resolution, a number of each horizontal parameter of the input pixels I(pv−2,ph−3), I(pv−2,ph−2), I(pv−2,ph−1) and I(pv−2,ph) on the previous two column relative to the reference input pixel I(pv, ph) equals to −1, and a number of each vertical parameter of the input pixels I(pv−3,ph−2), I(pv−2,ph−2) I(pv−1,ph−2) and I(pv,ph−2) on the previous two row relative to the reference input pixel I(pv, ph) equals to −1.

4. The method of claim 2, wherein the first resolution is scaled up to the second resolution, each horizontal parameter of the input pixels I(pv−3,ph−3), I(pv−3,ph−2), I(pv−3,ph−1) and I(pv−3,ph) on the previous three column relative to the reference input pixel I(pv, ph) equals to 1, and a number of each vertical parameter of the input pixels I(pv−3,ph−3), I(pv−2,ph−3) I(pv−1,ph−3) and I(pv,ph−3) on the previous three row relative to the reference input pixel I(pv, ph) equals to 1.

5. The method of claim 1, wherein a value of each horizontal parameter of the input pixels on the same column is identical, and a value of each vertical parameter of the input pixels on the same row is identical.

6. The method of claim 5, wherein when the first resolution is scaled down to the second resolution, and when a displayed area distributed by input pixels which are on the same column is separated away from the displayed area of the output pixel, a number of each horizontal parameter of the input pixels on the same column equals to 1 or −1.

7. The method of claim 5, wherein when the first resolution is scaled down to the second resolution, and when a displayed area distributed by input pixels which are on the same row is separated away from the displayed area of the output pixel, a number of each vertical parameter of the input pixels on the same row equals to 1 or −1.

8. The method of claim 1, further comprising:
interpolating pixel values of the plurality of input pixels based on a contrast coefficient prior to step (a).

9. The method of claim 8, wherein a value of the contract coefficient is in a range of 0.5 to 1.5.

10. The method of claim 8 further comprising:
if a sum of products of vertical parameters and horizontal parameters corresponding to the first group of input pixels is less than a sum of products of vertical parameters and horizontal parameters corresponding to the second group of input pixels multiplied by 8, setting each product of vertical parameters and horizontal parameters corresponding to the second group of input pixels as 1 or −1, wherein a displayed area distributed by the first group of input pixels interlaces a displayed area distributed by the output pixel but a displayed area distributed by the second group of input pixels is separated away from the displayed area of the output pixel.

11. The method of claim 8 further comprising:
if a sum of products of vertical parameters and horizontal parameters corresponding to the first group of input pixels is less than a sum of products of vertical parameters and horizontal parameters corresponding to the second group of input pixels multiplied by 8, multiplying all vertical parameters and horizontal parameters with a factor, wherein a displayed area distributed by the first group of input pixels interlaces a displayed area distributed by the output pixel but a displayed area distributed by the second group of input pixels is separated away from the displayed area of the output pixel.

* * * * *